US010659762B2

(12) United States Patent
Aoki et al.

(10) Patent No.: US 10,659,762 B2
(45) Date of Patent: May 19, 2020

(54) STEREO CAMERA

(71) Applicant: HITACHI AUTOMOTIVE SYSTEMS, LTD., Hitachinaka-shi, Ibaraki (JP)

(72) Inventors: Toshiyuki Aoki, Tokyo (JP); Takuma Osato, Tokyo (JP); Takeshi Nagasaki, Hitachinaka (JP); Naoya Tada, Hitachinaka (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 16/466,356

(22) PCT Filed: Dec. 15, 2017

(86) PCT No.: PCT/JP2017/045034
§ 371 (c)(1),
(2) Date: Jun. 4, 2019

(87) PCT Pub. No.: WO2018/123642
PCT Pub. Date: Jul. 5, 2018

(65) Prior Publication Data
US 2020/0068186 A1 Feb. 27, 2020

(30) Foreign Application Priority Data
Dec. 26, 2016 (JP) ................. 2016-250956

(51) Int. Cl.
*H04N 13/239* (2018.01)
*G06T 5/00* (2006.01)
*H04N 13/122* (2018.01)

(52) U.S. Cl.
CPC ........... *H04N 13/239* (2018.05); *G06T 5/006* (2013.01); *H04N 13/122* (2018.05); *G06T 2207/10012* (2013.01)

(58) Field of Classification Search
CPC .... H04N 13/239; H04N 13/122; G06T 5/006; G06T 2207/10012
See application file for complete search history.

(56) References Cited

U.S. PATENT DOCUMENTS 6,552,742 B1    4/2003  Seta
2008/0117290 A1*    5/2008  Mazza ................. H04N 13/239
                                                    348/47
(Continued)

FOREIGN PATENT DOCUMENTS

JP          2001-82955 A       3/2001
JP          2001-283199 A      10/2001
(Continued)

OTHER PUBLICATIONS

International Search Report with English translation and Written Opinion issued in corresponding application No. PCT/JP2017/045034 dated Apr. 10, 2018.

*Primary Examiner* — Joseph W Becker
(74) *Attorney, Agent, or Firm* — Foley & Lardner LLP

(57) ABSTRACT

The present invention provides a stereo camera in which it is possible to improve the precision of correcting vertical offset between a first image captured by a first image-capture unit and a second image captured by a second image-capture unit. In the present invention, an image-capture system unit 100*a* captures a benchmark image. An image-capture system unit 100*b* captures a reference image. A geometry correction unit 125 generates a plurality of geometry-corrected reference images having differing amounts of vertical-direction movement from the reference image. A parallax calculation unit 126 generates a plurality of parallax images from the combination of the benchmark image and each of the reference images. A parallax image evaluation unit 131 calculates evaluation values pertaining to the reliability of each of the parallax images. A vertical offset correction unit (Continued)

132: calculates, on the basis of a correspondence relationship between vertical offset and the evaluation values pertaining to reliability, an evaluation value pertaining to the maximum reliability and a vertical offset that corresponds to this evaluation value; and sets the vertical offset that corresponds to the evaluation value pertaining to the maximum reliability as a vertical offset correction amount.

10 Claims, 7 Drawing Sheets

(56) References Cited

U.S. PATENT DOCUMENTS

| | | | |
|---|---|---|---|
| 2012/0274627 A1 | 11/2012 | Huggett | |
| 2013/0002828 A1* | 1/2013 | Ding | G02B 17/0836 348/49 |
| 2017/0201736 A1 | 7/2017 | Ishimaru | |

FOREIGN PATENT DOCUMENTS

| | | |
|---|---|---|
| JP | 2004-354257 A | 12/2004 |
| JP | 2011-180022 A | 9/2011 |
| JP | 2016-8847 A | 1/2016 |
| JP | 2016-218758 A | 12/2016 |

\* cited by examiner

STEREO CAMERA

TECHNICAL FIELD

The present invention relates to a stereo camera.

BACKGROUND ART

There is known the related art in which a process of geometrically correcting two images is performed, features are extracted from the two images, and the same features on the two images are associated, and offsets of camera parameters are corrected on the basis of these features and a correspondence relationship of the images (for example, see PTL 1). Herein, in order to correct a camera parameter related to parallax, information on a distance between the feature and the camera or a distance between the features is used.

CITATION LIST

Patent Literature

PTL 1: JP 2004-354257 A

SUMMARY OF INVENTION

Technical Problem

In the related art disclosed in PTL 1, in a case where there is a large offset in a longitudinal direction between the right and left images which is caused by a mechanical offset such as a secular change, a thermal change, and an impulsive variation when a stereo camera is activated, there is a need to retrieve a region of a predetermined range in the longitudinal direction instead of retrieving only a region on the image of the same height in order to retrieve a correspondence relationship of features of two images. In the retrieval of features, a matching method is used in which an index indicating a difference between patterns of two features is calculated. In addition, in order to correct the offset in the longitudinal direction between the right and left images with high precision, there is a need to obtain the correspondence relationship of a plurality of features. In this matching method, the plurality of features are retrieved in the region of the predetermined range in the longitudinal direction in addition to the region on the image of the same height. Therefore, a processing load becomes large, it takes a long time until the offset of camera parameter in the longitudinal direction is corrected, the offset in the longitudinal direction between the right and left images becomes large in the period, and thus it is not possible to output a normal parallax image.

An object of the present invention is to provide a stereo camera in which it is possible to improve the precision of correcting vertical offset between a first image captured by a first image-capture unit and a second image captured by a second image-capture unit.

Solution to Problem

In order to achieve the above object, the invention includes a first image-capture unit which captures a first image, a second image-capture unit which captures a second image, a geometry correction unit which generates a plurality of third images having a different moving amount in a vertical direction from the second image, a parallax calculation unit which generates a plurality of parallax images from combinations of the first image and respective third images, a parallax image evaluation unit which calculates a reliable degree of each parallax image, and a vertical offset correction unit which calculates a maximum reliable degree and the moving amount corresponding to the maximum reliable degree on the basis of a correspondence relationship between the moving amount and the reliable degree, and sets the moving amount corresponding to the maximum reliable degree as a correction amount of a vertical offset.

Advantageous Effects of Invention

According to the invention, it is possible to improve the precision of correcting vertical offset between a first image captured by a first image-capture unit and a second image captured by a second image-capture unit. Objects, configurations, and effects besides the above description will be apparent through the explanation on the following embodiments.

DESCRIPTION OF EMBODIMENTS

Hereinafter, a configuration and an operation of a stereo camera according to an embodiment of the invention will be described using the drawings. The stereo camera calculates a depth image from a plurality of camera images for example, and recognizes a subject on the images to calculate a distance up to the subject.

Further, an object of the embodiment of the invention is partially overlapped with the above-described object, and is to provide a stereo camera which corrects a large vertical offset between the right and left images generated by a mechanical offset such as a secular change, a thermal change, and an impulsive variation in a short time with high precision.

Embodiments

Figure 1:
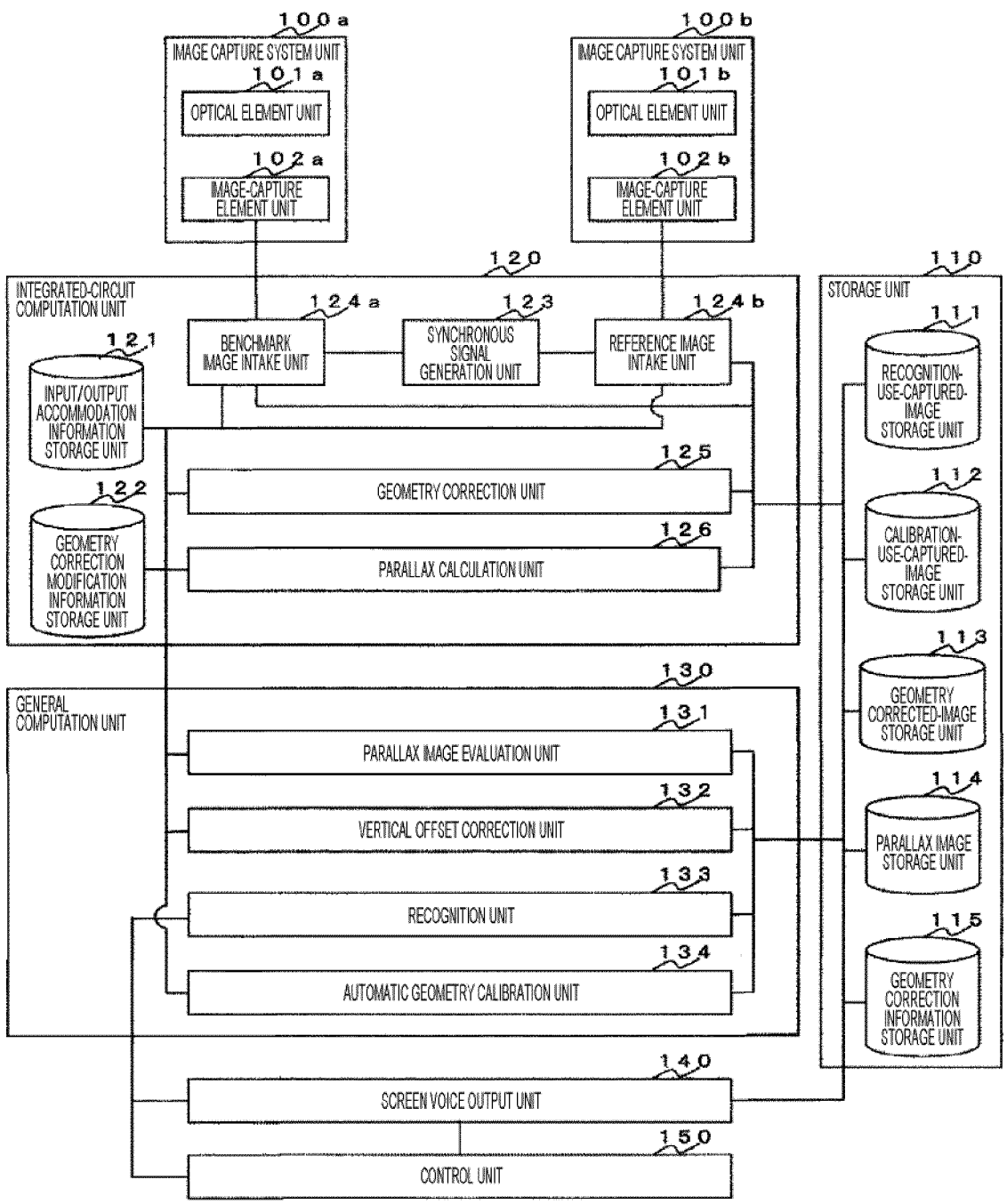
FIG. 1 is a diagram illustrating a configuration of a stereo camera of an embodiment of the invention.

FIG. 1 illustrates a configuration of the stereo camera of an embodiment of the invention.

The embodiment of the invention includes an image-capture system unit 100a, an image-capture system unit 100b, a storage unit 110, an integrated-circuit computation unit 120 (logical circuit), a general computation unit 130, a screen voice output unit 140, and a control unit 150.

The image-capture system unit 100a such as a camera includes an optical element unit 101a, and an image-capture element unit 102a.

The optical element unit 101a such as a lens refracts light to form an image on the image-capture element unit 102a.

The image-capture element unit 102a such as an image capturing element receives an image of the light refracted by the optical element unit 101a, and generates an image according to an intensity of the light.

In other words, the image-capture system unit 100a (first image-capture unit) captures a first image.

The image-capture system unit 100b such as a camera includes an optical element unit 101b, and an image-capture element unit 102b. In addition, the design values of focal distances of the image-capture system unit 100a and the image-capture system unit 100b are equal.

The directions of the optical axes of the image-capture system unit 100a and the image-capture system unit 100b are almost the same.

The optical element unit 101b such as a lens refracts light to form an image on the image-capture element unit 102b.

The image-capture element unit 102b such as an image capturing element receives an image of the light refracted by the optical element unit 101b, and generates an image according to an intensity of the light.

In other words, the image-capture system unit 100b (second image-capture unit) captures a second image.

The image (first image) captured by the image-capture system unit 100a is an image which becomes a benchmark for creating a parallax image, and thus called a benchmark image. In addition, the image (second image) captured by the image-capture system unit 100b is an image from which a region matched to the region extracted from the benchmark image is retrieved when the parallax image is created, and called a reference image.

The storage unit 110 configured by a memory includes a recognition-use-captured-image storage unit 111, a calibration-use-captured-image storage unit 112, a geometry-corrected-image storage unit 113, a parallax image storage unit 114, and a geometry correction information storage unit 115.

The recognition-use-captured-image storage unit 111 such as a memory stores the images output from the image-capture system unit 100a and the image-capture system unit 100b. These images are subjected to the geometry correction by a geometry correction unit 125, and are finally used to perform the recognition of a vehicle or a pedestrian by a recognition unit 133.

The calibration-use-captured-image storage unit 112 such as a memory stores the images output from the image-capture system unit 100a and the image-capture system unit 100b. These images are subjected to the geometry correction by the geometry correction unit 125, and are finally used to calculate the vertical offset between the benchmark image and the reference image by a vertical offset correction unit 132.

The geometry-corrected-image storage unit 113 such as a memory stores the benchmark image (the geometry-corrected benchmark image) and the reference image (the geometry-corrected reference image) obtained by geometrically correcting the captured benchmark image (the benchmark image after capturing) and the captured reference image (the reference image after capturing).

The parallax image storage unit 114 such as a memory stores the parallax image.

The geometry correction information storage unit 115 such as a memory stores two-dimensional coordinates (geometry correction information) which is on the image (after capturing) having distortion and corresponds to pixels on the image having no distortion in the benchmark image and the reference image. The geometry correction information (mapping such as affine transformation) is used to correct a lens distortion and an optical axis offset of the benchmark image and the reference image after capturing by the geometry correction unit 125. In other words, the geometry correction information storage unit 115 (storage unit) stores the geometry correction information (mapping) indicating a correspondence relationship before and after the geometry correction of the benchmark image (first image) and the reference image (second image). The geometry correction unit 125 corrects an optical distortion of the benchmark image and the reference image using the geometry correction information.

In addition, the geometry correction information storage unit 115 stores moving amounts in the vertical direction and the horizontal direction of the benchmark image and the reference image to correct offsets in the vertical direction and the horizontal direction generated by mechanical offsets such as a secular change, a thermal change, and an impulsive variation in the benchmark image and the reference image where the geometry correction is performed using the geometry correction information.

The integrated-circuit computation unit 120 such as an field-programmable gate array (FPGA) or an application specific integrated circuit (ASIC) includes an input/output accommodation information storage unit 121, a geometry correction modification information storage unit 122, a synchronous signal generation unit 123, a benchmark image intake unit 124a, a reference image intake unit 124b, the geometry correction unit 125, and a parallax calculation unit 126.

The input/output accommodation information storage unit 121 such as a register stores information (address) of places in the storage unit 110 where the data input/output by the benchmark image intake unit 124a, the reference image intake unit 124b, the geometry correction unit 125, and the parallax calculation unit 126 is stored. Herein, initial values of the output destinations of the benchmark image intake unit 124a and the reference image intake unit 124b are set to the recognition-use-captured-image storage unit 111 of the storage unit 110. In addition, the initial value of an input place of the input of the geometry correction unit 125 is set to the recognition-use-captured-image storage unit 111 of the storage unit 110.

The geometry correction modification information storage unit 122 such as a register stores the horizontal moving amount and the vertical moving amount of the benchmark image and the reference image to further move the image from the geometry correction information to the horizontal direction and the vertical direction when the geometry correction unit 125 performs the geometry correction on the image. Herein, the initial values of the horizontal moving amount and the vertical moving amount of the benchmark image and the reference image are zero.

The synchronous signal generation unit 123 generates and transmits a synchronization signal.

The benchmark image intake unit 124a sends the synchronization signal and exposure time information to the image-capture element unit 102a together with the synchronization signal of the synchronous signal generation unit 123, and acquires an image generated by the image-capture element unit 102a. The benchmark image intake unit 124a reads output place information of the image from the input/output accommodation information storage unit 121, and stores the image at the place of the storage unit 110.

The reference image intake unit 124b sends the synchronization signal and the exposure time information to the image-capture element unit 102b together with the synchronization signal of the synchronous signal generation unit 123, and acquires the image generated by the image-capture element unit 102b. The reference image intake unit 124b reads output destination information of the image from the input/output accommodation information storage unit 121, and stores the image at the place of the storage unit 110.

The geometry correction unit 125 reads input destination information of the image from the input/output accommodation information storage unit 121, and reads the benchmark image and the reference image from the place of the storage unit 110. The geometry correction unit 125 reads the geometry correction information from the geometry correction information storage unit 115, and reads the horizontal moving amount and the vertical moving amount of the benchmark image and the reference image from the geometry correction modification information storage unit 122. The geometry correction unit 125 adds the horizontal moving amount and the vertical moving amount of the benchmark image and the reference image together at the two-dimensional coordinates (geometry correction information) on the image having distortion which corresponds to each pixel on the image having no distortion in the benchmark image and the reference image (geometry correction information). The geometry correction unit 125 performs the geometry correction on the basis of the benchmark image and the reference image after capturing, and the added geometry correction information, and calculates an image having no distortion. In other words, the geometry correction unit 125 corrects the optical distortion of the benchmark image (first image) and the reference image (second image). The geometry correction unit 125 stores the geometry-corrected benchmark image and the geometry-corrected reference image in the geometry-corrected-image storage unit 113.

The parallax calculation unit 126 reads the geometry-corrected benchmark image and the geometry-corrected reference image from the geometry-corrected-image storage unit 113, and retrieves a region at the same height on the reference image corresponding to a predetermined-size region (template image) extracted from the benchmark image. The parallax calculation unit 126 calculates a difference (that is, parallax) between the position of the region on the reference image matched with the template image and the position of the template image on the benchmark image. The parallax calculation unit 126 calculates the parallax with respect to the regions to calculate the parallax image. Next, the parallax calculation unit 126 determines whether the parallax is valid or invalid on the basis of a coincidence between the regions (template image) on the benchmark image and the region on the reference image most matched to these regions. The parallax calculation unit 126 stores the parallax image in the parallax image storage unit 114.

The general computation unit 130 configured by a CPU (central processing unit) includes a parallax image evaluation unit 131, the vertical offset correction unit 132, the recognition unit 133, and an automatic geometry calibration unit 134.

The parallax image evaluation unit 131 counts the number of valid regions (the number of valid blocks) of the parallax image, and calculates an evaluation value of reliability of the parallax image when the reference image is shifted by a predetermined interval $\Delta Y$ in the vertical direction in a predetermined range (that is, when the geometry-corrected benchmark image and the geometry-corrected reference image are shifted by the predetermined interval $\Delta Y$ in the predetermined range).

The vertical offset correction unit 132 obtains a vertical offset of the largest number of valid regions of the parallax image (that is, a vertical offset of the evaluation value pertaining to a largest reliability of the parallax image), and set the vertical offset as a correction amount $\Delta Yc$ of a vertical offset.

The recognition unit 133 reads the parallax image from the parallax image storage unit 114, and calculates a distance from the stereo camera up to the subject in the optical axial direction of the image-capture system unit 100a and the image-capture system unit 100b on the basis of the parallax, a distance between focuses of the image-capture system unit 100a and the image-capture system unit 100b (base line length), the focal distances, and the size of one pixel. The recognition unit 133 calculates a distance to each region to calculate the depth image. Next, the recognition unit 133 reads the geometry-corrected benchmark image from the geometry-corrected-image storage unit 113, recognizes the position of the subject on the benchmark image and the position of the subject on the benchmark image using the geometry-corrected benchmark image and the depth image, and calculates a three-dimensional relative position and a relative speed of the subject with respect to the stereo camera.

Herein, in the three-dimensional relative coordinate system with respect to the stereo camera, the principal point of the image-capture system unit 100a is the origin point, the x coordinate in the right direction with respect to the image-capture system unit 100a, the y coordinate is in the lower direction, and the z coordinate in the optical axial direction. In addition, the recognition unit 133 calculates a time until confliction on the basis of the relative position and the relative speed of the stereo camera and the subject, and determines whether the confliction occurs within a predetermined time. The recognition unit 133 sends the relative position, the relative speed, a confliction determination result, and a confliction time between the stereo camera and the subject to the screen voice output unit 140 and the control unit 150.

The automatic geometry calibration unit 134 reads the geometry-corrected benchmark image and the geometry-corrected reference image from the geometry-corrected-image storage unit 113, and the parallax image from the parallax image storage unit 114, calculates a horizontal moving amount $\Delta X2$ and a vertical moving amount $\Delta Y2$ of the benchmark image such that the optical axial position (vanishing point) on the geometry-corrected benchmark image becomes the design value on the basis of the information, and calculates a horizontal moving amount $\Delta X1$ of the reference image such that the parallax at the optical axial position (vanishing point) on the geometry-corrected benchmark image becomes zero. The automatic geometry calibration unit 134 stores these results in the geometry correction information storage unit 115.

The screen voice output unit 140 such as a monitor and a speaker displays the benchmark image, the parallax image, or the depth image in a screen. In addition, the screen voice output unit 140 displays a frame or a marker at the position of the subject. At this time, the color of the frame or the marker of the subject determined to come into conflict from the confliction determination result from the recognition unit 133 is changed to another color for the subject which does not come into conflict. The screen voice output unit 140 outputs a warning sound in a case where there is a subject determined to come into conflict from the confliction determination result from the recognition unit 133.

The control unit 150 such as a CPU generates a control signal on the basis of the relative position, the relative speed, the confliction time, and the confliction determination result between the stereo camera and the subject, and outputs the signal to the outside of the stereo camera.

Figure 2:
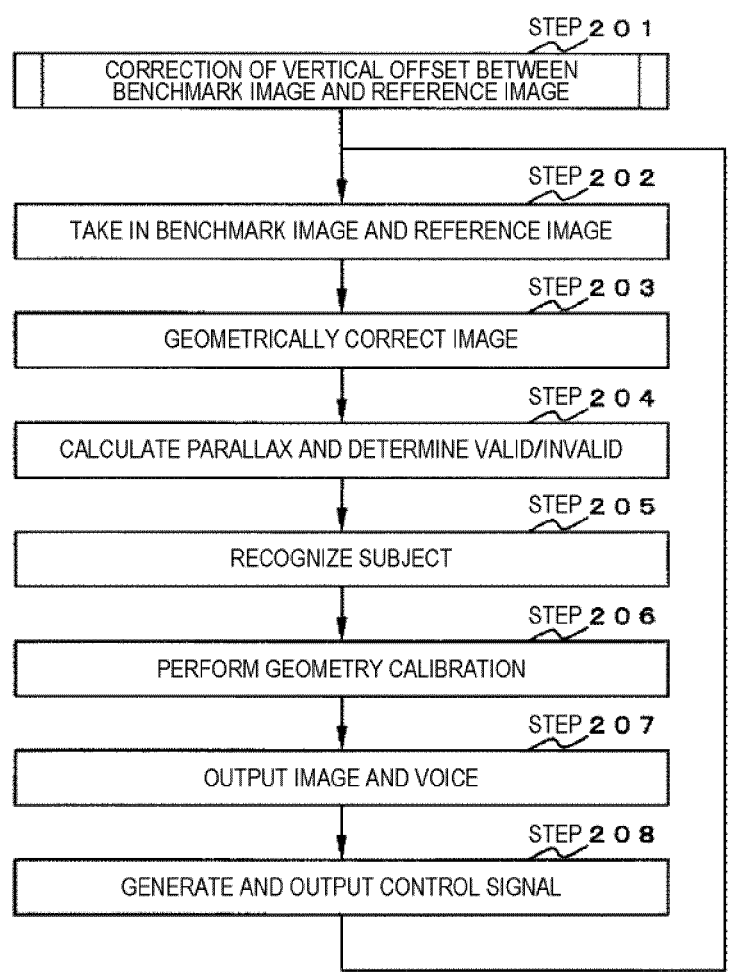
FIG. 2 is a diagram illustrating an operation of the stereo camera.

An operation procedure of the embodiment of the stereo camera of the invention illustrated in FIG. 1 will be described using FIGS. 2 and 3.

Entire Flow

Step 201: the geometry correction unit 125 geometrically corrects the reference image after capturing, and calculates the geometry-corrected reference image in which the reference image is shifted in the vertical direction by the predetermined interval $\Delta Y$ in the predetermined range. In other words, the geometry correction unit 125 generates a plurality of geometry-corrected reference images (third image) which have different moving amounts in the vertical direction from the reference image (second image).

The parallax calculation unit 126 calculates the parallax image on the basis of the geometry-corrected benchmark image and the geometry-corrected reference image, and determines valid/invalid of each region of the parallax image. In other words, the parallax calculation unit 126 generates the plurality of parallax images from the combination of the benchmark image (first image) and each reference image (third image).

The parallax image evaluation unit 131 calculates the number of valid regions (that is, the evaluation value pertaining to reliability of the parallax image) of the parallax image which is calculated from the geometry-corrected benchmark image and the geometry-corrected reference image obtained by shifting the reference image in the vertical direction by the predetermined interval $\Delta Y$ in the predetermined range. In other words, the parallax image evaluation unit 131 calculates a reliable degree of each parallax image. Further, the evaluation value (reliable degree) pertaining to reliability may be called an index indicating the number of valid parallax in each parallax image.

The vertical offset correction unit 132 calculates the correction amount $\Delta Yc$ of the vertical offset on the basis of the number of valid regions (the evaluation value pertaining to reliability) of the parallax image calculated from the geometry-corrected benchmark image and the geometry-corrected reference image obtained by shifting the reference image in the vertical direction by the predetermined interval $\Delta Y$ in the predetermined range. The operation procedure of this step is illustrated in FIG. 3. Further, the details will be described below.

Step 202: the synchronous signal generation unit 123 generates the synchronization signal, and sends the signal to the benchmark image intake unit 124*a* and the reference image intake unit 124*b*. The benchmark image intake unit 124*a* sends the synchronization signal and the exposure time information to the image-capture element unit 102*a* immediately after the synchronization signal from the synchronous signal generation unit 123 is received. The image-capture element unit 102*a* receives the image of the light refracted by the optical element unit 101*a* by the exposure time immediately after the synchronization signal and the exposure time information from the benchmark image intake unit 124*a* is received, and generates and sends the image according to the intensity of the light to the benchmark image intake unit 124*a*.

The benchmark image intake unit 124*a* receives the image from the image-capture element unit 102*a*, reads the output place information of the image from the input/output accommodation information storage unit 121, and stores the image at the place of the storage unit 110. Herein, the output destination of the benchmark image intake unit 124*a* in Step 304 is set to the recognition-use-captured-image storage unit 111. Therefore, the image is stored in the recognition-use-captured-image storage unit 111.

The reference image intake unit 124*b* sends the synchronization signal and the exposure time information to the image-capture element unit 102*b* immediately after the synchronization signal from the synchronous signal generation unit 123 is received. The image-capture element unit 102*b* receives the image of the light refracted by the optical element unit 101*b* immediately after the synchronization signal and the exposure time information from the reference image intake unit 124*b* are received, generates the image according to the intensity of the light, and sends the image to the reference image intake unit 124*b*. The reference image intake unit 124*b* receives the image from the image-capture element unit 102*b*, reads the output place information of the image from the input/output accommodation information storage unit 121, and stores the image at the place of the storage unit 110. Herein, the output destination of the reference image intake unit 124*b* in Step 304 is set to the recognition-use-captured-image storage unit 111. Therefore, the image is stored in the recognition-use-captured-image storage unit 111.

Step 203: the geometry correction unit 125 reads the input place of the image from the input/output accommodation information storage unit 121, and reads the benchmark image and the reference image after capturing at the place (the recognition-use-captured-image storage unit 111) of the storage unit 110. The geometry correction unit 125 reads the geometry correction information (mapping Fx) between the benchmark image and the reference image from the geometry correction information storage unit 115, and reads the horizontal moving amount and the vertical moving amount of the benchmark image and the reference image from the geometry correction modification information storage unit 122.

Using Equation (1) and Equation (2), the geometry correction unit 125 calculates the position (X1, Y1) of the benchmark image before capturing corresponding to the pixel (X2, Y2) of the geometry-corrected benchmark image on the basis of the coordinates (Fx(X2, Y2), Fy(X2, Y2)) on the image after capturing corresponding to each pixel on the geometry-corrected benchmark image, the horizontal moving amount $\Delta X2$ of the benchmark image, and the vertical moving amount $\Delta Y2$.

[Equation 1]

$$X1 = Fx(X2,Y2) + \Delta X2 \qquad (1)$$

[Equation 2]

$$Y1 = Fy(X2,Y2) + \Delta Y2 \qquad (2)$$

The geometry correction unit 125 linearly interpolates luminance values of four pixels around the position (X1, Y1) of the benchmark image in a two-dimensional manner to calculate the luminance value of the pixel (X2, Y2) of the geometry-corrected benchmark image. The geometry correction unit 125 performs the above procedure on each pixel of the geometry-corrected benchmark image to calculate the luminance values of the geometry-corrected benchmark image. In addition, the geometry correction unit 125 performs the above procedure even on the reference image to calculate the luminance values of the geometry-corrected reference image. The geometry correction unit 125 stores the geometry-corrected benchmark image and the reference image in the geometry-corrected-image storage unit 113.

Figure 4:
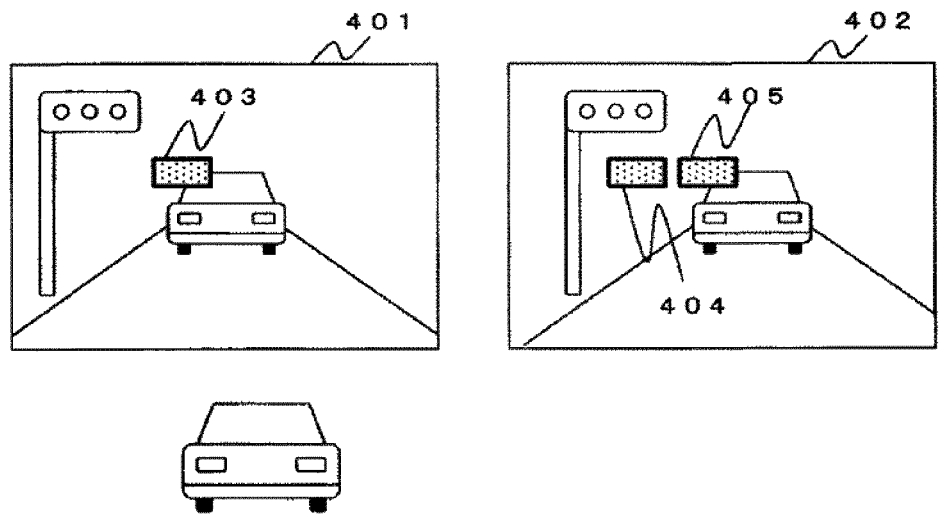
FIG. 4 is a diagram illustrating the benchmark image and the reference image.

Step 204: the parallax calculation unit 126 reads the geometry-corrected benchmark image and the reference image from the geometry-corrected-image storage unit 113. As illustrated in FIG. 4, the parallax calculation unit 126 extracts an image 403 (template image) of the predetermined-size region of the geometry-corrected benchmark image 401. The parallax calculation unit 126 retrieves the image of the region showing the same subject as the template image 403 in the geometry-corrected reference image 402 by template matching.

The parallax calculation unit 126 extracts an image 404 (retrieved image) of the predetermined-size region of the reference image 402 at the same height as the template image 403, and calculates a sum (SAD, Sum of Absolute Difference) of the absolute values of the differences between the luminance values of the template image 403 and the luminance values of the retrieved image 404. The parallax calculation unit 126 calculates the SAD with respect to the respective retrieved image 404 on the reference image 402 at the same height as the template image 403 to retrieve the retrieved image 405 having the smallest SAD value. The parallax calculation unit 126 performs an isometric linear fitting using the SAD of the retrieved image 405 and the SAD of the retrieved images of adjacent right one pixel and left one pixel from the retrieved image 405, and calculates a subpixel of the retrieved image 405 on the reference image which is most matched to the template image 403. The parallax calculation unit 126 adds the subpixel to the difference of the positions of the template image 403 and the retrieved image 405 to calculate the parallax of the template image 403 on the geometry-corrected benchmark image 401.

Next, the parallax calculation unit 126 determines whether the parallax is valid or invalid by the following two determination methods. In a case where it is determined that a minimum value of the obtained SAD is equal to or more than a threshold using the retrieved image 404 on the reference image 402 at the same height as the template image 403, the parallax calculation unit 126 determines that the template 403 and the retrieved image 405 are not matched and the parallax of the region is invalid. In a case where the minimum value of the SAD is less than the threshold, it is determined that the parallax is valid.

Figure 5:
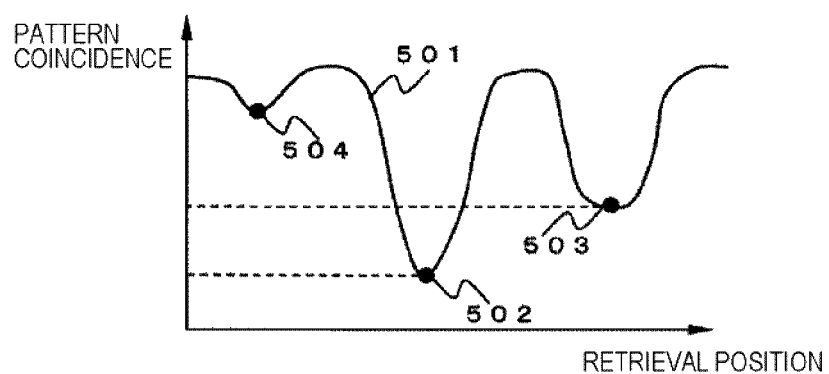
FIG. 5 is a diagram illustrating a coincidence between a retrieval position and a pattern in parallax calculation.

In addition, as illustrated in FIG. 5, the parallax calculation unit 126 calculates the difference (a slope of the SAD) between the adjacent SAD and the SAD in the SAD 501 indicating a coincidence of the pattern. Places 502 to 504 where the value of the difference is changed from negative to positive are calculated. The place 502 where the SAD is smallest and the place 503 of the second largest SAD are calculated. In a case where the difference of the SADs is less than the threshold, there is a possibility that there is a pattern similar to the template image and mismatching occurs. Therefore, it is determined that the parallax of the region is invalid. If not, it is determined that the parallax is valid. Herein, in a case where there is only one place where the difference of the adjacent SAD is changed from negative to positive, the parallax is determined as valid. In a case where a region determined as valid by both the determination methods is determined as valid. In a case where a region determined as invalid by any one of the methods is determined as invalid.

In other words, the parallax calculation unit 126 calculates a similarly between the template image 403 of the benchmark image and the retrieved image 404 of the reference image with respect to a plurality of combinations of the retrieved image 404 (region) of the reference image (third image) at the same height as the template image 403 (region) of the benchmark image (first image). The parallax is calculated from the template image 403 of the benchmark image and the retrieved image 404 of the reference image of which the similarity is maximized. In a case where the maximum similarity is less than a first threshold, the parallax calculation unit 126 determines that the parallax is invalid. In a case where there are two or more maximum values of the similarity, and a difference between a largest maximum value and the second largest maximum value is less than a second threshold, the parallax calculation unit 126 determines that the parallax is invalid. In a case where a maximum similarity is equal to or more than the first threshold, and there is only one maximum value of the similarity, the parallax calculation unit 126 determines that the parallax is valid. In a case where the maximum similarity is equal to or more than the first threshold, there are two or more maximum values of the similarity, and the difference between the largest maximum value and the second largest maximum value is equal to or more than the second threshold, the parallax calculation unit 126 determines that the parallax is valid. With this configuration, it is possible to determine whether the parallax is valid.

Such a process is performed on all the regions on the geometry-corrected benchmark image to calculate the entire parallax of the benchmark image 401. The parallax image calculated as described above is stored in the parallax image storage unit 114.

Step 205: the recognition unit 133 reads the parallax image from the parallax image storage unit 114, and the geometry-corrected image (the geometry-corrected benchmark image and the reference image) from the geometry-corrected-image storage unit 113.

The recognition unit 133 calculates a distance L to the stereo camera in the region on the parallax image in the optical axial direction using Equation (3). Herein, f represents a design value of the focal distance of the image-capture system unit 100*a* and the image-capture system unit 100*b*, B represents a distance (base line length) between the principal points of the image-capture system unit 100*a* and the image-capture system unit 100*b*, d represents parallax, and c represents a pixel pitch of the image-capture element unit 102*a* and the image-capture element unit 102*b*.

[Equation 3]

$$L = f \times B / (d \times c) \qquad (3)$$

The recognition unit 133 performs the process on all the regions of the parallax image, and calculates a distance of the stereo camera in the entire parallax image in the optical axial direction to create the depth image.

Next, the recognition unit 133 calculates a position of the vanishing point on the benchmark image, determines the subject such as an automobile and a pedestrian, calculates the relative position and the relative speed of the subject with respect to the stereo camera, and determines a confliction between the subject and the stereo camera.

First, the recognition unit 133 calculates the position of the vanishing point on the benchmark image in the following procedure. White lines on both sides at the boundary of the lane on the benchmark image are detected to calculate the slope of the white line on the benchmark image. If the white lines on both sides are straight lines, a position on the benchmark image at a point where the withe lines on both sides cross each other is calculated from the calculated slope. That position is the position of the vanishing point.

Next, the recognition unit 133 detects the subject such as an automobile and a pedestrian in the following procedure.

The recognition unit 133 obtains a region 1 in the depth image where pixels continuing at a distance within the predetermined range. As an example of the predetermined range, a plurality of ranges which are overlapped by 2.5 m in a range of 5 m wide with 5 to 10 m, 7.5 to 12.5 m, and 10 to 15 m. The recognition unit 133 obtains lengths in the longitudinal and lateral directions on the benchmark image of each region 1 where the pixels continuing at a distance within the predetermined range. The recognition unit 133 divides a value obtained by multiplying the length, the distance, and the pixel pitch in the longitudinal direction on the benchmark image of each region 1 by the focal distance to calculate a three-dimensional length in the longitudinal direction of each region 1. Similarly, the recognition unit 133 divides a value obtained by multiplying the length, the distance, and the pixel pitch in the lateral direction on the benchmark image of each region 1 by the focal distance to calculate a three-dimensional length in the lateral direction of each region 1. The recognition unit 133 approximately calculates a position Vg in the longitudinal direction on the benchmark image related to the ground surface of each region 1 using Equation (4). Herein, Vv represents a height at the vanishing point, Hi represents an installation height of the stereo camera, and Lr represents an average distance of the region 1. In addition, Equation (4) is a calculation formula on the assumption that the optical axes of the image-capture system unit 100a and the image-capture system unit 100b are almost in the horizontal direction.

[Equation 4]

$$Vg = Vv - f \times Hi / (Lr \times c) \quad (4)$$

In a case where the three-dimensional lengths in the longitudinal and lateral directions of the region 1 are within the predetermined range of an automobile, and the difference between a lower position in the longitudinal direction on the benchmark image of the region 1 and the position in the longitudinal direction on the benchmark image of the ground surface of the region 1 calculated by Equation (2) is within a threshold, the recognition unit 133 determines that the subject of the region 1 is an automobile. Similarly, in a case where the three-dimensional lengths in the longitudinal and lateral directions of the region 1 are within the predetermined range of a pedestrian, and the difference between a lower position in the longitudinal direction on the benchmark image of the region 1 and the position in the longitudinal direction on the benchmark image of the ground surface of the region 1 calculated by Equation (2) is within a threshold, the recognition unit 133 determines that the subject of the region 1 is a pedestrian. These processes are performed on all the regions 1. The recognition unit 133 determines whether the subject is an automobile or a pedestrian.

Next, the recognition unit 133 calculates the relative position and the relative speed of the subject with respect to the stereo camera. The recognition unit 133 calculates the relative position (Xo, Yo, Zo) of the subject with respect to the stereo camera using Equations (5) to (7) in the region 1 in which the subject is determined as an automobile or a pedestrian. Herein, (Uo, Vo) represents a position on the benchmark image related to the center of the region 1 in which the subject is determined as an automobile or a pedestrian.

[Equation 5]

$$Xo = Lr \times c \times Uo / f \quad (5)$$

[Equation 6]

$$Yo = Hi + Lr \times c \times (Vo - Vv) / f \quad (6)$$

[Equation 7]

$$Zo = Lr \quad (7)$$

The processes of Steps 202 to 208 are repeatedly performed in a predetermined period. In a case where the difference between the positions on the benchmark image of the region 1 detected in Step 205 of the current and previous processes is within the threshold, the subjects are determined as the same. A value obtained by subtracting the relative position calculated in Step 205 of the previous process from the relative position of the subject with respect to the stereo camera calculated in the current process is divided by a time interval of a processing cycle of Steps 202 to 208 to calculate the relative speed (Vx, Vy, Vz) of the subject with respect to the stereo camera.

Finally, the recognition unit 133 determines the confliction between the subject and the stereo camera in the following procedure. In a case where a relative speed Vz of the subject with respect to the stereo camera is equal to or more than 0, the recognition unit 133 determines that there is no conflict with the subject of the region 1 determined as an automobile or a pedestrian. In a case where the relative speed Vz of the subject with respect to the stereo camera is negative, the recognition unit 133 divides a relative position Zo of the subject with respect to the stereo camera calculated in the current process by an absolute value of the relative speed Vz of the subject with respect to the stereo camera, and calculates a time (confliction time) taken until the confliction. In addition, the recognition unit 133 adds a relative position Xo of the subject to the value obtained by multiplying the confliction time to a relative speed Vx of the subject with respect to the stereo camera to calculate the relative position Xo of the subject with respect to the stereo camera at the time of confliction. Then, in a case where the relative speed Vz of the subject with respect to the stereo camera is negative, the confliction time falls within the threshold, and an absolute value of the relative position Xo of the subject with respect to the stereo camera at the time of confliction falls within the threshold, the recognition unit 133 determines that there is confliction with the subject of the region 1 determined as an automobile or a pedestrian. In other cases, the recognition unit 133 determines that there is confliction. The recognition unit 133 sends positions of four corners on the benchmark image related to the region 1 determined as an automobile or a pedestrian, the relative position and the relative speed of the subject with respect to the stereo camera, the confliction determination result, and the confliction time to the screen voice output unit 140 and the control unit 150.

Step 206: the automatic geometry calibration unit 134 reads the geometry-corrected benchmark image and the reference image from the geometry-corrected-image storage unit 113, and the parallax image from the parallax image storage unit 114. The automatic geometry calibration unit 134 detects the right and left white lines of the lane on the geometry-corrected benchmark image to calculate approximate straight lines of the right and left white lines. The automatic geometry calibration unit 134 calculates an intersecting position of the approximate straight lines of the right and left white lines. On the assumption that the intersecting position is the vanishing point and matched to the position of the optical axis on the benchmark image, a difference between the intersecting position and the design value of the position of the optical axis is calculated as the correction amounts in the horizontal direction and the vertical direction of the benchmark image. The automatic geometry calibration unit 134 sends these correction amounts to the geometry correction information storage unit 115 and the geometry correction modification information storage unit 122 as the horizontal moving amount $\Delta X2$ and the vertical moving amount $\Delta Y2$ of the benchmark image. The geometry correction information storage unit 115 and the geometry correction modification information storage unit 122 store the horizontal moving amount $\Delta X2$ and the vertical moving amount $\Delta Y2$ of the benchmark image.

With regard of the reference image, the automatic geometry calibration unit 134 similarly detects the right and left white lines of the lane on the geometry-corrected reference image to calculate approximate straight lines of the right and left white lines. The intersecting position of the approximate straight lines of the right and left white lines us calculated. On the assumption that the intersecting position is the vanishing point and matched to the position of the optical axis on the reference image, the difference between the intersecting position and the design value of the position of the optical axis is calculated as the correction amounts in the horizontal direction of the reference image. These correction amounts are sent to the geometry correction information storage unit 115 and the geometry correction modification information storage unit 122 as the horizontal moving amount $\Delta X1$ of the reference image. The geometry correction information storage unit 115 and the geometry correction modification information storage unit 122 store the horizontal moving amount $\Delta X1$ of the reference image.

Step 207: the screen voice output unit 140 receives the positions of four corners on the benchmark image related to the region 1 determined as an automobile or a pedestrian, the relative position and the relative speed of the subject with respect to the stereo camera, the confliction determination result, and the confliction time from the recognition unit 133. The screen voice output unit 140 reads the geometry-corrected benchmark image from the geometry-corrected-image storage unit 113. The benchmark image is displayed in a screen, and the region 1 determined as an automobile or a pedestrian is displayed with a frame. In addition, the screen voice output unit 140 changes the color of the frame of the region 1 of the subject of the confliction determination result indicating confliction into the color of the frame of the region 1 of the subject of the determination result indicating no confliction, and displays in the screen. In a case where the confliction determination result indicates confliction in the region 1, the screen voice output unit 140 outputs a warning sound.

Step 208: the control unit 150 receives the positions of four corners on the benchmark image related to the region 1 determined as an automobile or a pedestrian, the relative position and the relative speed of the subject with respect to the stereo camera, the confliction determination result, and the confliction time from the recognition unit 133. In a case where the confliction determination result indicates confliction in the region 1 determined as an automobile or a pedestrian, a control signal for avoiding the confliction is generated and output to the outside of the stereo camera.

Correction of Vertical Offset

An operation procedure of correcting the vertical offset between the benchmark image and the reference image of Step 201 of the operation procedure of the embodiment of the stereo camera of the invention will be described using FIG. 3.

Step 301: the vertical offset correction unit 132 reads the vertical moving amounts of the benchmark image and the reference image from the geometry correction information storage unit 115.

Step 302: the vertical offset correction unit 132 sets the output destinations of the benchmark image intake unit 124a and the reference image intake unit 124b of the input/output accommodation information storage unit 121 to the calibration-use-captured-image storage unit 112 of the storage unit 110.

Step 303: the synchronous signal generation unit 123 generates the synchronization signal, and sends the signal to the benchmark image intake unit 124a and the reference image intake unit 124b. The benchmark image intake unit 124a sends the synchronization signal and the exposure time information to the image-capture element unit 102a immediately after the synchronization signal from the synchronous signal generation unit 123 is received. The image-capture element unit 102a receives the image of the light refracted by the optical element unit 101a by the exposure time immediately after the synchronization signal and the exposure time information from the benchmark image intake unit 124a is received, and generates and sends the image according to the intensity of the light to the benchmark image intake unit 124a.

The benchmark image intake unit 124a receives the image from the image-capture element unit 102a, reads the output place information of the image from the input/output accommodation information storage unit 121, and stores the image at the place of the storage unit 110. Herein, the output destination of the benchmark image intake unit 124a in Step 302 is set to the calibration-use-captured-image storage unit 112. Therefore, the image is stored in the calibration-use-captured-image storage unit 112.

The reference image intake unit 124b sends the synchronization signal and the exposure time information to the image-capture element unit 102b immediately after the synchronization signal from the synchronous signal generation unit 123 is received. The image-capture element unit 102b receives the image of the light refracted by the optical element unit 101b immediately after the synchronization signal and the exposure time information from the reference image intake unit 124b are received, generates the image according to the intensity of the light, and sends the image to the reference image intake unit 124b. The reference image intake unit 124b receives the image from the image-capture element unit 102b, reads the output place information of the image from the input/output accommodation information storage unit 121, and stores the image at the place of the storage unit 110. Herein, the output destination of the reference image intake unit 124b in Step 302 is set to the calibration-use-captured-image storage unit 112. Therefore, the image is stored in the calibration-use-captured-image storage unit 112.

Step 304: the vertical offset correction unit 132 sets the output destinations of the benchmark image intake unit 124$a$ and the reference image intake unit 124$b$ of the input/output accommodation information storage unit 121 to the recognition-use-captured-image storage unit 111 of the storage unit 110.

Step 305: the vertical offset correction unit 132 sets the input place of the geometry correction unit 125 of the input/output accommodation information storage unit 121 to the calibration-use-captured-image storage unit 112 of the storage unit 110.

Step 306: the vertical offset correction unit 132 sets a minimum value $\Delta Y0$ in the predetermined range to the vertical moving amount $\Delta Y1$ ($=\Delta Y0$) of the reference image of the geometry correction modification information storage unit 122 with a vertical moving amount $\Delta Y1$ of the reference image read in Step 301 as the center. Herein, in the second and later operations, the vertical offset correction unit 132 sets a value further increased by $\Delta Y$ from the minimum value in the predetermined range with the vertical moving amount of the reference image as the center to the vertical moving amount $\Delta Y1$ ($=\Delta Y1+\Delta Y$) of the reference image of the geometry correction modification information storage unit 122.

Step 307: with the similar operation to Step 203, the geometry correction unit 125 geometrically corrects the benchmark image and the reference image after capturing, and moves the reference image in the vertical direction by the predetermined interval $\Delta Y$ in the predetermined range.

Step 308: the parallax calculation unit 126 performs the operation similar to Step 204.

Step 309: the parallax image evaluation unit 131 counts the number of regions determined as valid in the parallax image.

Step 310: in a case where the vertical moving amount of the reference image is all set for every predetermined interval $\Delta Y$ in the predetermined range, and Step 306 to Step 309 are performed, the process proceeds to Step 311. If not, the process proceeds to Step 306.

Step 311: the vertical offset correction unit 132 sets the vertical moving amount $\Delta Y1$ of the reference image read in Step 301 to the vertical moving amount $\Delta Y1$ of the reference image of the geometry correction modification information storage unit 122, and sets the input place of the geometry correction unit 125 of the input/output accommodation information storage unit 121 to the recognition-use-captured-image storage unit 111 of the storage unit 110.

Figure 6:
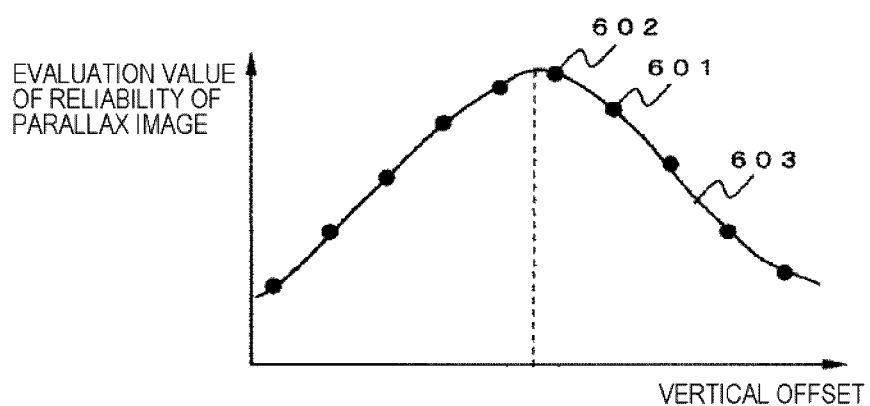
FIG. 6 is a diagram illustrating the vertical offset in the vertical offset correction between the benchmark image and the reference image and an evaluation value pertaining to reliability of a parallax image.

Step 312: the vertical offset correction unit 132 sets the difference between the vertical moving amounts of the benchmark image and the reference image to the vertical offset of the benchmark image and the reference image. As illustrated in FIG. 6, the vertical offset correction unit 132 calculates the quadratic approximation 603 from the vertical offset (the vertical offset of the maximum number of valid regions 602) at which the number of valid regions of the parallax image is maximum using the data of the number of valid regions of the predetermined range in the number of valid regions 601 indicating an evaluation value of reliability of the parallax image in the vertical offset. The value of the vertical offset where the quadratic approximation of the number of valid regions becomes a maximum value is calculated, and is set to the correction amount $\Delta Yc$ of the vertical offset. The evaluation value pertaining to reliability of the parallax image indicates a coincidence in the vertical direction between the benchmark image and the reference image.

In other words, the vertical offset correction unit 132 calculates, on the basis of a correspondence relationship between the vertical offset (moving amount) and the evaluation value pertaining to reliability (reliable degree), the evaluation value pertaining to the maximum reliability and a vertical offset that corresponds to this evaluation value, and sets the vertical offset that corresponds to the evaluation value pertaining to the maximum reliability as the correction amount of the vertical offset. With this configuration, it is possible to calculate the correction amount of the vertical offset with precision.

Step 313: in a case where the following conditions are all satisfied, the vertical offset between the benchmark image and the reference image calculated in Step 312 is determined as normal, and the process proceeds to Step 314. If not, the vertical offset calculated in Step 312 is determined as abnormal, and the process proceeds to Step 301. Herein, in the first and second conditions (i) and (ii), it is checked whether a position in which the vertical offset between the benchmark image and the reference image is detected is within a predetermined range of the vertical offset. In the third condition (iii), it is checked whether the calculation of the quadratic approximation is normal. In the fourth condition (iv), it is checked whether there is a change in the number of valid regions of the parallax image, and the vertical offset of the maximum number of valid regions can be detected with precision.

(i) The maximum number of valid regions of the parallax image is not in the edge of the predetermined range of the vertical offset.

(ii) The maximum value of the quadratic approximation is within the predetermined range of the vertical offset.

(iii) A correlation coefficient of the quadratic approximation is equal to or more than the threshold.

(iv) The difference between the minimum and maximum numbers of valid regions of the parallax image is equal to or more than the threshold.

Step 314: the vertical offset correction unit 132 reads the vertical moving amount $\Delta Y1$ of the reference image from the geometry correction information storage unit 115, adds a correction amount $\Delta Yc$ of a vertical offset to the vertical moving amount $\Delta Y1$ of the reference image, and stores as the vertical moving amount $\Delta Y1$ ($\Delta Y1=\Delta Y1+\Delta Yc$) of the reference image in the geometry correction information storage unit 115. In addition, a value obtained by adding the correction amount $\Delta Yc$ of the vertical offset to the vertical moving amount of the reference image is stored as the vertical moving amount $\Delta Y1$ of the reference image in the geometry correction modification information storage unit 122.

As a result, the geometry correction unit 125 corrects the vertical offset between the benchmark image (first image) and the reference image (second image) by the correction amount $\Delta Yc$ ($=\Delta Y1$) of the vertical offset.

In the operation procedure (FIGS. 2 and 3) of the embodiment of the stereo camera of the invention illustrated in FIG. 1, if the vertical offset of the benchmark image and the reference image becomes small, a coincidence between the template image on the benchmark image and the retrieved image on the reference image at the same height as the template image is improved, and the number of valid regions of the parallax image is increased. The vertical offset of the benchmark image and the reference image is changed by the predetermined interval ΔY to obtain the vertical offset where the number of valid regions of the parallax image is maximized.

In a case where the vertical offset between the benchmark image and the reference image is large immediately after the stereo camera is activated, there is no region on the region which is matched to each region on the benchmark image. Therefore, a valid parallax does not appear on the parallax image. Even if there is a vehicle or a pedestrian on the front side, the subject is not possible to be detected. The conflict preventing function may be not worked normally.

In addition, in a method of retrieving the region on the reference image corresponding to the region on the benchmark image, the retrieving region is wide, and a processing time is taken. According to the operation procedure (FIGS. 2 and 3) of the embodiment of the stereo camera of the invention illustrated in FIG. 1, the geometry correction of an image and the creating process of the parallax image are performed in real time by the parallax calculation unit 126 and the geometry correction unit 125 of the integrated-circuit computation unit 120. Therefore, it is possible to correct the vertical offset of the geometry-corrected benchmark image and the reference image in a short time. In addition, the entire surface of the benchmark image and the reference image is used, so that the vertical offset can be detected with high precision. Therefore, immediately after the stereo camera is activated, it is possible to correct the vertical offset between the benchmark image and the reference image, output the parallax image normally, and operate the conflict preventing function can be operated normally.

Figure 7:
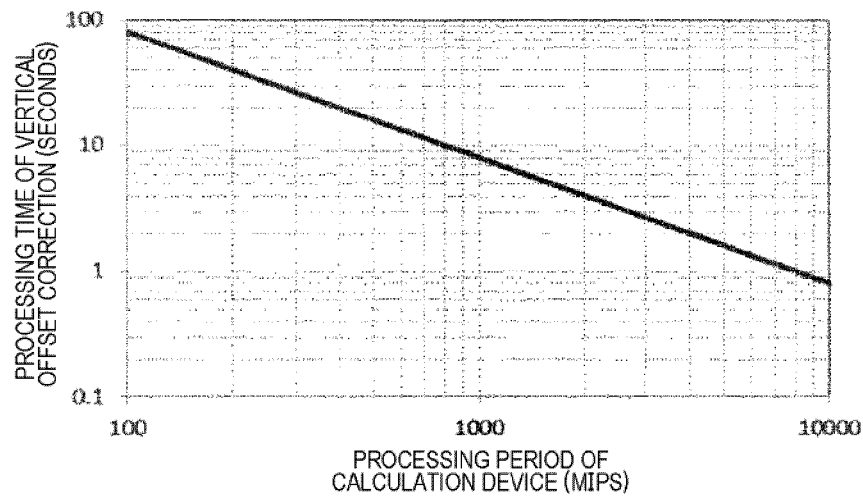
FIG. 7 is a diagram illustrating a processing time of the vertical offset correction in a processing cycle of a calculation device.

With regard to Steps 301 and 314 of the operation procedure of the embodiment of the stereo camera of the invention illustrated in FIG. 1, it is possible to calculate a command value of the vertical offset correction on the basis of an image size, a template image (region) size of the parallax calculation, a parallax image size, a retrieval width at the time of creating the parallax image, and the number of creating the parallax image. If the command value is divided by the processing cycle (fclock) of a calculation device such as a CPU or an FPGA, the processing time can be calculated. FIG. 7 is a graph illustrating a relation between the processing cycle of the calculation device and the processing time of the vertical offset correction. In a case where a time obtained by adding the processing time of the vertical offset correction and an initial setting time of the stereo camera is equal to or less than a required time taken from the activation (power on) of the stereo camera up to starting sensing, the embodiment of the invention can be realized in that device.

Further, the stereo camera of the invention is not limited to the embodiment described above, and various modifications can be made. In the following, modifications of the stereo camera of the invention will be described.

(Modification 1-1)

In Step 204 of the operation procedure (FIG. 2) of the embodiment of the stereo camera of the invention illustrated in FIG. 1, while the parallax calculation unit 126 can calculate Zero-mean Sum of Absolute Differences (ZSAD), Sum of Squared Differences (SSD), Zero-mean Sum of Squared Differences (ZSSD), Normalized Cross Correlation (NCC), or Zero-mean Normalized Cross Correlation (ZNCC), retrieve a region on the reference image of the smallest SAD value to calculate the parallax instead of calculating the SAD value, retrieving a region on the reference image of which the SAD value is smallest, and calculating the parallax.

(Modification 1-2)

In Step 309 of the operation procedure (FIG. 3) of the embodiment of the stereo camera of the invention illustrated in FIG. 1, the parallax image evaluation unit 131 can detect the road surface to calculate a reciprocal of a deviation (standard deviation) of the parallax in a predetermined region of the road surface, and detect the vertical offset between the benchmark image and the reference image using the reciprocal as the evaluation value pertaining to reliability of the parallax image instead of counting the number of valid regions of the parallax image. If the vertical offset between the benchmark image and the reference image becomes large, it is not possible to calculate the parallax with precision, and the characteristic that the value of the parallax deviates is used.

Figure 8:
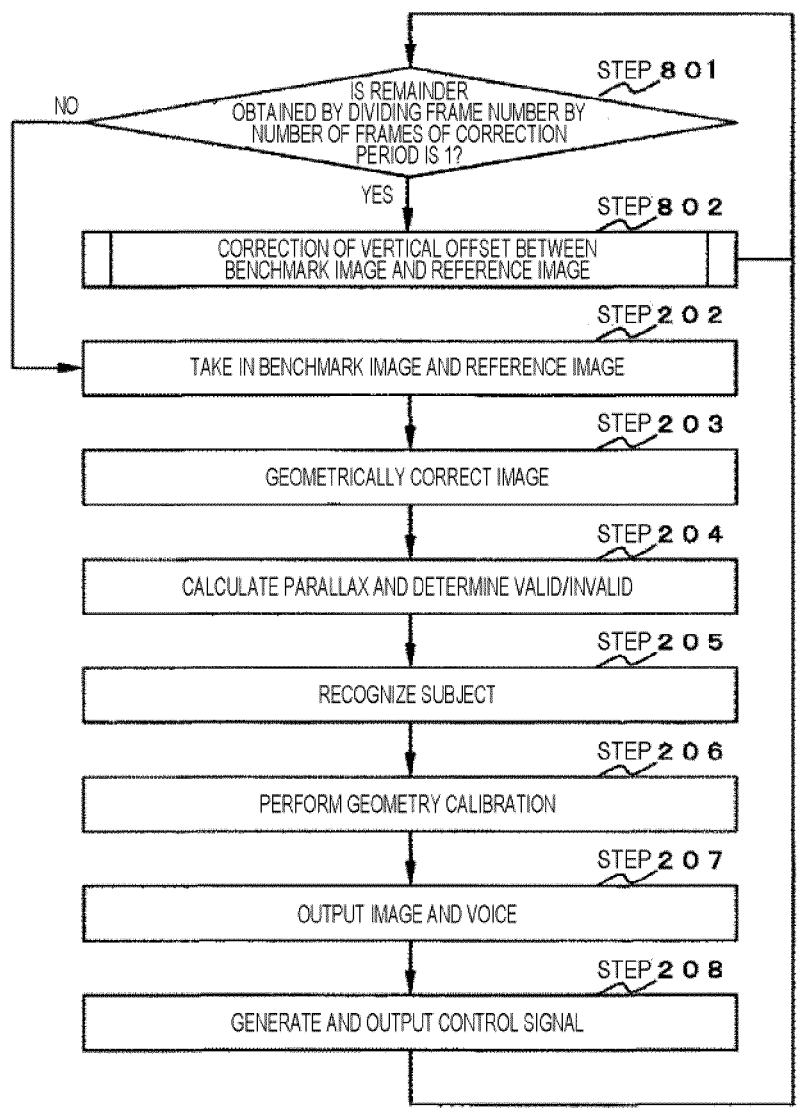
FIG. 8 is a diagram illustrating an operation of the stereo camera.
Figure 9:
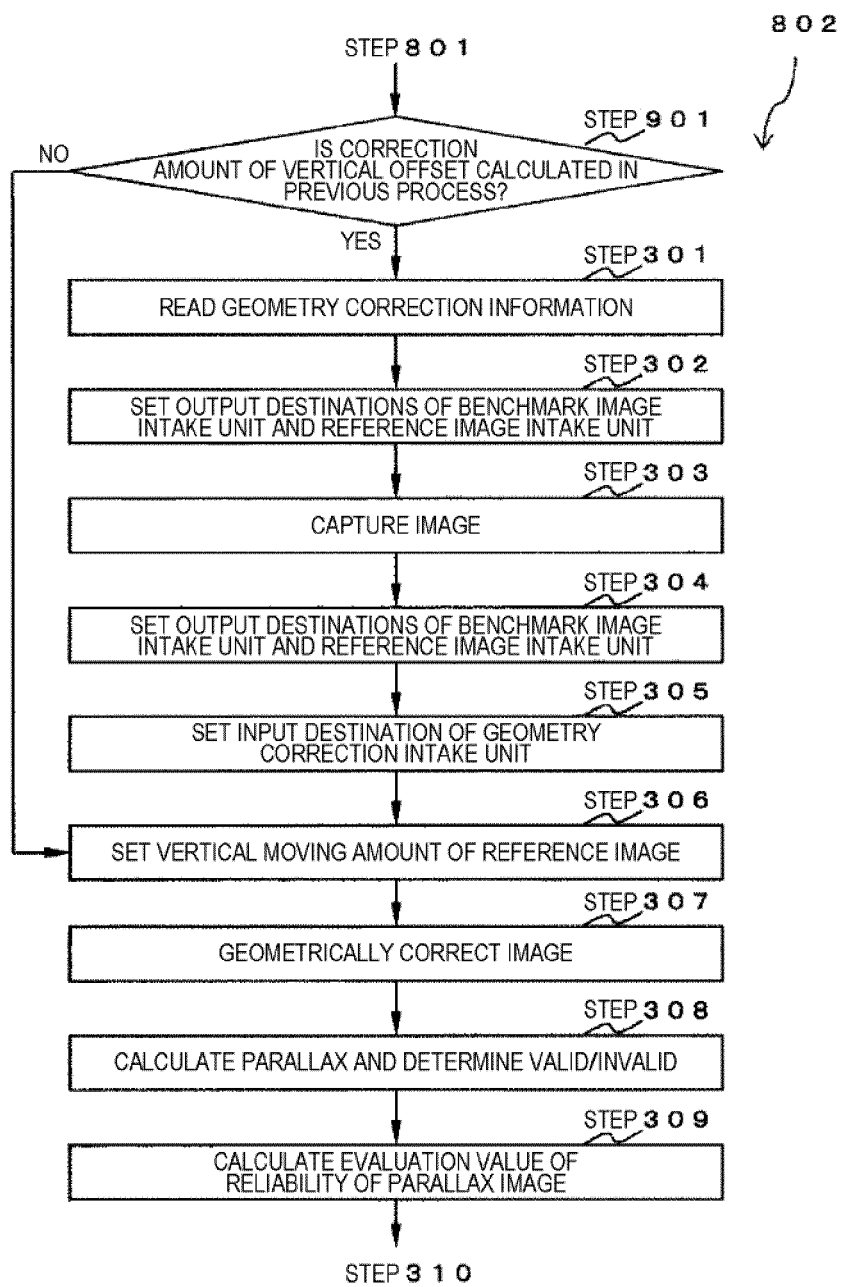
FIG. 9 is a diagram illustrating an operation of correcting the vertical offset between the benchmark image and the reference image of the stereo camera.
Figure 10:
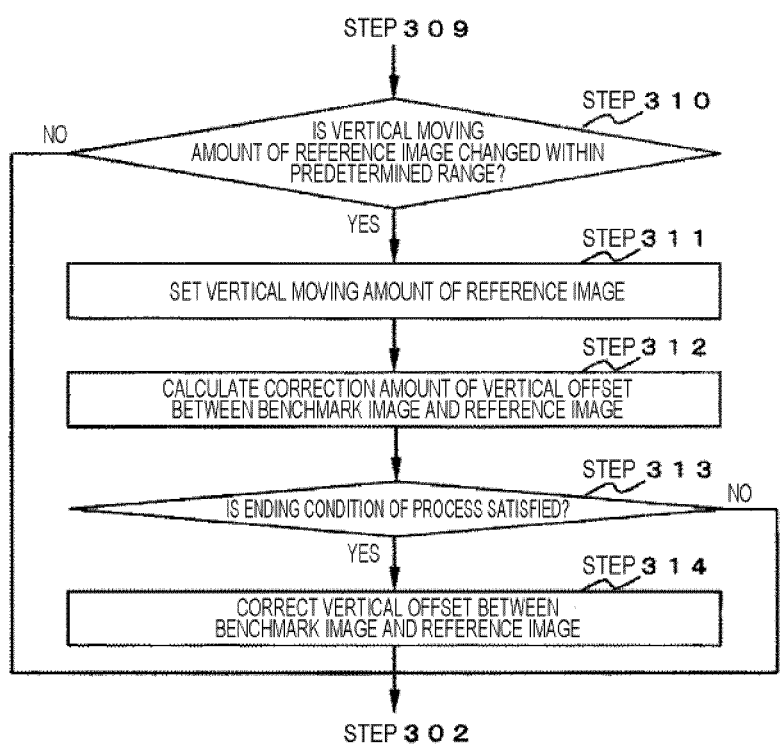
FIG. 10 is a diagram illustrating an operation of correcting the vertical offset between the benchmark image and the reference image of the stereo camera.

(Modification 1-3) FIGS. 8 to 10 illustrate the operation procedure of the embodiment of the stereo camera of the invention illustrated in FIG. 1. Further, the explanation on the operation procedure of Steps 202 to 208 described already will be omitted.

Step 801: in a case where a remainder obtained by dividing the number of frames of a correction period by the frame number is 1, the process proceeds to Step 802. If not, the process proceeds to Step 202.

Step 802: the parallax image evaluation unit 131 calculates the evaluation value pertaining to reliability of the parallax image. The vertical offset correction unit 132 calculates and corrects the vertical offset between the benchmark image and the reference image on the basis of the evaluation value. FIGS. 9 and 10 illustrate the operation procedure of this step.

An operation procedure of correcting the vertical offset between the benchmark image and the reference image of Step 802 of the operation procedure of the embodiment of the stereo camera of the invention will be described using FIGS. 9 and 10. Further, the explanation on the operation procedure of Steps 301 and 312 described already will be omitted. However, if the condition is not satisfied in Steps 310 and 313, the process proceeds to Step 302.

Step 901: in the previous process of correcting the vertical offset between the benchmark image and the reference image, in a case where the correction amount ΔYc of the vertical offset is calculated in Step 312, the process proceeds to Step 301. If not, the process proceeds to Step 306.

According to the operation procedure (FIGS. 8 to 10) of the embodiment of the stereo camera of the invention illustrated in FIG. 1, there is performed a process of calculating and correcting the vertical offset between the benchmark image and the reference image in a predetermined period (cycle). In other cases, the parallax image is created, and recognizes the subject such as a vehicle and a pedestrian. If a confliction to the subject is determined, a signal for preventing a confliction is output. In a process of one frame of correcting the vertical offset between the benchmark image and the reference image, one parallax image is created. If the process is performed by a predetermined number of parallax images used when the vertical offset is corrected, the correction amount ΔYc of the vertical offset is calculated one time. For example, Step 802 is performed one time for five frames. In a case where the number of parallax images necessary for calculating the correction amount ΔYc of the vertical offset is 9, the correction amount ΔYc of the vertical offset is calculated one time for 45 frames (5 frames×9).

Even when the stereo camera is operating, the vertical offset between the benchmark image and the reference image is generated by the mechanical offset such as a secular change, a thermal change, and an impulsive variation.

According to the operation procedure (FIGS. 8 to 10) of the embodiment of the stereo camera of the invention illustrated in FIG. 1, the correction amount ΔYc of the vertical offset between the benchmark image and the reference image can always be calculated when the stereo camera is operating. Therefore, it is possible to correct the vertical offset between the benchmark image and the reference image caused by the mechanical offset such as a secular change, a thermal change, and an impulsive variation which is generated during the operation of the stereo camera.

With regard to Steps 306 to 309 of the operation procedure of the embodiment of the stereo camera of the invention illustrated in FIG. 1, a command value of the calculating process of the evaluation value pertaining to reliability of one parallax image on the basis of an image size, the size of the template image (region) of calculating the parallax, and the size of the parallax image. If the command value is divided by the processing cycle (fclock) of the calculation device, the processing time can be calculated. In a case where the processing time for calculating the evaluation value pertaining to reliability of one parallax image is equal to or less than a sensing period, the embodiment of the invention can be realized by that device.

As described above, according to this embodiment, it is possible to improve the correction precision of the vertical offset between the benchmark image (first image) captured by the image-capture system unit 100a (first image-capture unit) and the reference image (second image) captured by the image-capture system unit 100b (second image-capture unit).

Further, the invention is not limited to the above embodiments, but various modifications may be contained. For example, the above-described embodiments of the invention have been described in detail in a clearly understandable way, and are not necessarily limited to those having all the described configurations.

For example, the mapping showing the correspondence relationship before and after the geometry correction of the first image and the second image may include moving the second image in the vertical direction by the correction amount of the vertical offset. In a case, the geometry correction unit 125 corrects the optical distortion between the first image and the second image using the mapping, and also corrects the vertical offset generated by the mechanical offset such as a secular change, a thermal change, and an impulsive variation.

Figure 3:
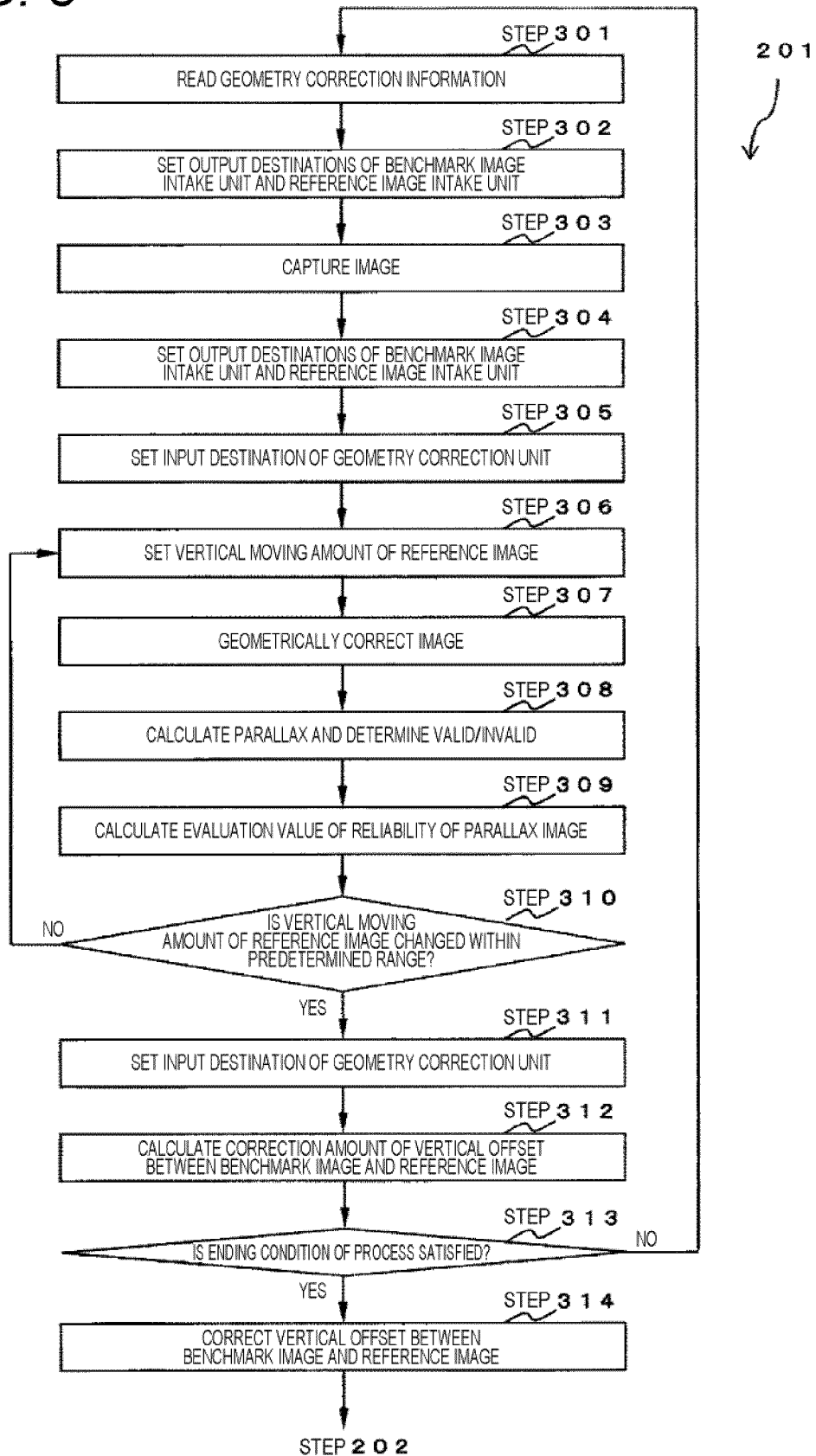
FIG. 3 is a diagram illustrating an operation of correcting a vertical offset between a benchmark image and a reference image of the stereo camera.

The process of FIG. 3 may be performed when the stereo camera is activated. In addition, the process of FIG. 3 may be performed in a case where the ambient temperature of the stereo camera is changed by the threshold or more in a predetermined time. Further, the ambient temperature of the stereo camera is measured by a temperature sensor.

The temperature sensor may be attached to the stereo camera, or may be attached to a vehicle.

In addition, some or all of the configurations and functions may be realized in hardware such as an integrated circuit. In addition, the configurations and functions may be realized by software which analyzes and executes a program for executing each function by a processor (the general computation unit 130). The information of the program realizing functions, tables, and files may be secured in a recording device such as a memory, a hard disk, a Solid State Drive (SSD) or a recording medium such as an IC card, an SD card, and a DVD.

Further, the embodiment of the invention may be configured as follows.

(1) A stereo camera which includes two image-capture units which captures a benchmark image and a reference image, an image geometry correction unit which shifts the reference image by a predetermined value in a vertical direction, a parallax image generation unit which generates a parallax image, an evaluation unit which calculates an evaluation value pertaining to reliability of the parallax image, and a correction unit which calculates a value of a vertical offset which increases the evaluation value pertaining to reliability of the parallax image to correct the value of the vertical offset as a correction amount.

(2) In the stereo camera of (1), the image geometry correction unit adds a predetermined value to a table indicating a geometry correspondence relationship immediately after image correction on an integrated circuit, shifts the entire image in the vertical direction, and geometrically corrects the image.

(3) In the stereo camera of (1), the process of (1) is performed when the stereo camera is activated.

(4) In the stereo camera of (2), the geometry correction unit the table used in the geometry correction is corrected to shift the entire reference image in the vertical direction by a predetermined value.

(5) In the stereo camera of claim 4, a process of shifting the table by an erroneous amount is performed by the integrated circuit.

(6) In the stereo camera of claim 2, a process of generating the parallax image is performed by the integrated circuit.

(7) In the stereo camera of (1), in a case where a temperature is changed by a threshold or more within a predetermined time, the process of (1) is performed.

(8) In the stereo camera of (1), in a predetermined cycle, the image geometry correction unit performs a process of shifting the reference image by a predetermined value in the vertical direction. In a predetermined cycle, the parallax image generation unit performs a process of generating the parallax image. In a predetermined cycle, the evaluation unit calculates an evaluation value pertaining to reliability of the parallax image to calculate the evaluation value pertaining to reliability of the parallax image by the vertical offset with which the reference image is shifted in the vertical direction within the predetermined range. The correction unit performs the correction using the vertical offset as the correction amount at which the evaluation value pertaining to reliability of the parallax image is increased.

According to (1) to (8), a correction amount of the vertical offset between the benchmark image and the reference image is obtained using the evaluation value pertaining to reliability which is obtained from the entire parallax image. Therefore, the correction precision is high compared to a method in which only a feature that is a part of the benchmark image and the reference image is used. In addition, the geometry correction and the process of generating the parallax image are realized in real time by the parallax calculation unit 126 and the geometry correction unit 125 of the integrated-circuit computation unit 120, so that the correction can be made in a short time.

REFERENCE SIGNS LIST

100a image-capture system unit
100b image-capture system unit
101a optical element unit
101b optical element unit
102a image-capture element unit
102b image-capture element unit
110 storage unit 111 recognition-use-captured-image storage unit
112 calibration-use-captured-image storage unit
113 geometry-corrected-image storage unit
114 parallax image storage unit
115 geometry correction information storage unit
120 integrated-circuit computation unit
121 input/output accommodation information storage unit
122 geometry correction modification information storage unit
123 synchronous signal generation unit
124a benchmark image intake unit
124b reference image intake unit
125 geometry correction unit
126 parallax calculation unit
130 general computation unit
131 parallax image evaluation unit
132 vertical offset correction unit
133 recognition unit
134 automatic geometry calibration unit
140 screen voice output unit
150 control unit
401 benchmark image
402 reference image
403 template image of benchmark image
404 retrieved image of reference image
405 retrieved image most matched to template image
501 obtained SAD in retrieved image at same height as that of template image
502 position at which SAD is minimized at place where difference from adjacent SAD is changed from negative to positive
503 position at which SAD is second smallest at place where difference from adjacent SAD is changed from negative to positive
504 place where difference in SAD from adjacent one is changed from negative to positive
601 place of evaluation value pertaining to reliability of parallax image in vertical offset in benchmark image and reference image
602 place of vertical offset at which evaluation value pertaining to reliability of parallax image is maximized
603 quadratic approximation of evaluation value pertaining to reliability of vertical offset and parallax image

The invention claimed is:

1. A stereo camera, comprising:
a first image-capture unit which captures a first image;
a second image-capture unit which captures a second image;
a geometry correction unit which generates a plurality of third images having a different moving amount in a vertical direction from the second image;
a parallax calculation unit which generates a plurality of parallax images from combinations of the first image and respective third images;
a parallax image evaluation unit which calculates a reliable degree of each parallax image; and
a vertical offset correction unit which calculates a maximum reliable degree and the moving amount corresponding to the maximum reliable degree on the basis of a correspondence relationship between the moving amount and the reliable degree, and sets the moving amount corresponding to the maximum reliable degree as a correction amount of a vertical offset.

2. The stereo camera according to claim 1,
wherein the geometry correction unit
corrects optical distortions of the first image and the second image,
and corrects the vertical offset between the first image and the second image using the correction amount of the vertical offset.

3. The stereo camera according to claim 2, further comprising:
a storage unit which stores a mapping showing a correspondence relationship between the first image and the second image before and after a geometry correction,
wherein the geometry correction unit
corrects the optical distortions of the first image and the second image using the mapping, and
corrects the vertical offset between the first image and the second image using the correction amount of the vertical offset.

4. The stereo camera according to claim 1,
wherein at least the vertical offset correction unit
operates when the stereo camera is activated.

5. The stereo camera according to claim 3,
wherein the mapping
includes moving the second image in the vertical direction by the correction amount of the vertical offset, and
wherein the geometry correction unit
corrects the vertical offset between the first image and the second image using the mapping.

6. The stereo camera according to claim 1,
wherein the geometry correction unit and the parallax calculation unit are logical circuits.

7. The stereo camera according to claim 1,
wherein at least the vertical offset correction unit
operates in a case where an ambient temperature of the stereo camera is changed by equal to or more than a threshold within a predetermined time.

8. The stereo camera according to claim 1,
wherein at least the vertical offset correction unit
operates in a predetermined cycle.

9. The stereo camera according to claim 1,
wherein the reliable degree is an index indicating the number of valid parallax in each of the parallax image.

10. The stereo camera according to claim 9,
wherein the parallax calculation unit
calculates a similarity of a region of the first image and a region of the third image with respect to each of a plurality of combinations of the region of the first image and the region of the third image of the same height as the region of the first image, and calculates the parallax from the region of the first image and the region of the third image in which the similarity is maximized,
determines that the parallax is invalid in a case where the maximum similarity is less than a first threshold,
determines that the parallax is invalid in a case where there are two or more maximum values of the similarity, and a difference between a largest maximum value and a second largest maximum value is less than a second threshold,
determines that the parallax is valid in a case where the maximum similarity is equal to or more than the first threshold, and the number of maximum values of the similarity is only one, and
determines that the parallax is valid in a case where the maximum similarity is equal to or more than the first threshold, the number of maximum values of the similarity is equal to or more than two, and the difference between the largest maximum value and the second largest maximum value is equal to or more than the second threshold.

* * * * *